(Model.)

G. SCOTT.
Printer's Quoin.

No. 232,551. Patented Sept. 21, 1880.

Witnesses.
E. Jaeger
W. W. Richards

Inventor
Geo Scott

N. PETERS, PHOTO-LITHOGRAPHER, WASHINGTON, D. C.

UNITED STATES PATENT OFFICE.

GEORGE SCOTT, OF MONTREAL, CANADA, ASSIGNOR OF ONE-HALF OF HIS RIGHT TO JOHN YOUNG, OF SAME PLACE.

PRINTER'S QUOIN.

SPECIFICATION forming part of Letters Patent No. 232,551, dated September 21, 1880.

Application filed July 3, 1880. (Model.) Patented in Canada November 12, 1879.

*To all whom it may concern:*

Be it known that I, GEORGE SCOTT, of the city and district of Montreal, in the Dominion of Canada, have invented a new and useful Improvement in Printers' Quoins; and I do hereby declare that the following is a full, clear, and exact description of the same, reference being had to the accompanying drawings, forming part of this specification, in which—

Figure 1:
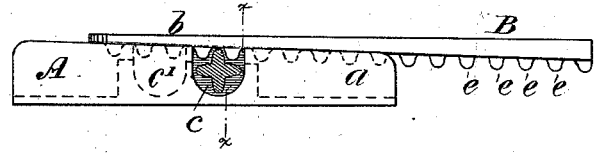
Figure 2:
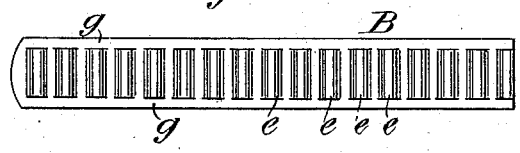
Figure 3:
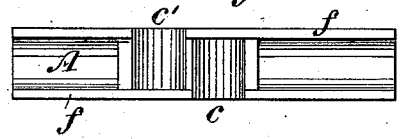
Figure 4:
Figure 6:
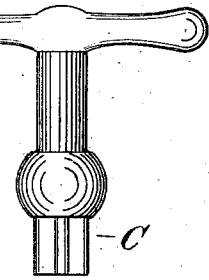
Figure 5:
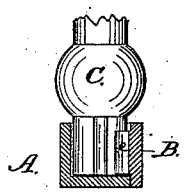
Figure 7:

Figure 1 is a side view of the quoin, showing the two parts of the quoin and the relation of the pinion-key to the same in "locking up." Fig. 2 is an inner or face view of the rack-bar. Fig. 3 is a similar view of the box. Fig. 4 is an end view of the box. Fig. 5 is a transverse section through line $x$ $x$ of Fig. 1. Figs. 6 and 7 are respectively side and end views of the pinion-key.

This invention has reference to that class of printers' material known as "quoins," which are used in various ways for the purpose of locking up forms for use in the press. It has more particular relation to that form of quoin in which two wedge-shaped pieces are provided with a straight series of teeth, which are geared together by a pinion-key, and are projected over each other to expand the quoin by the rotary action of the key.

Numerous alleged improvements in quoins have been introduced, but with indifferent success. The requirements are rapidity in operation, perfect security in locking up, and occupation of the least possible space.

My invention consists of means constructed on the general principle described for accomplishing these results, as hereinafter fully described, and pointed out in the claim.

In the drawings is illustrated my improved quoin, which is composed of two detached pieces—a box, A, and a rack-bar, B. The box A is made of a slightly-tapering wedge form, with its upper and lower sides parallel, and with recesses $c$ $c'$ formed in said upper and lower sides to admit the pinion-key C, which is adapted to revolve therein in proper working contact with the teeth $e$ $e$ formed on the inner surface of the wedge-shaped rack-bar B. The teeth $e$ $e$ extend the full length of the rack-bar, and are arranged in transverse position centrally upon the same, so that the length of the teeth shall be sufficiently less than the width of the bar to leave plain marginal bearings $g$ $g$ on the inner face, which slide on the contiguous projecting marginal faces $f f$ formed on the upper and lower sides of the box, while the rack-teeth pass along between the faces $f f$ and project into the chamber of the box.

It will be observed that I use a very slight taper of about two degrees only, by means of which I secure perfect stability of parts after locking up, and the effort required to adjust the quoin is reduced to a minimum.

Mode of using: Place the two pieces A and B together, with the inner faces of their thin ends in contact; then push up the rack until the teeth $e$ $e$ appear in the uppermost recess, $c$. Now enter the key C, which will engage with the teeth $e$ $e$, and turn the same, when the action will be to cause the wedge-shaped rack to slide over the tapering bearings of the box and expand the quoin by projecting the parts across each other until a suitable pressure is obtained, when the key is withdrawn and the parts locked by frictional contact.

In defining my invention more clearly, I would state that I am aware of Patent No. 204,820, and reissued Patent No. 8,210, and do not claim anything shown therein.

The distinct features of my invention are to be found in the continuous row of rack-teeth in the center line of the sliding bar B as combined with the overhanging edges $f f$ of the box A, by which pressure is applied to the center line of the movable bar instead of to the edge of the same, which latter arrangement has a tendency to twist apart or rock the two bars at one side only and throw the parts into false position.

Another distinct advantage of my construction is that the entrance of the teeth $e$ $e$ between the overhanging edges $f f$ prevents lateral displacement of the two parts for every position of the two parts in their longitudinal adjustment the one upon the other.

Having thus described my invention, what I claim as new is—

The combination, with the box having overhanging or projecting edges $f\,f$, of a detachable tapering bar, B, having a central series of teeth extending throughout its length, which teeth are of less length than the width of the bar, so as to leave marginal bearing-surfaces $g\,g$, substantially as and for the purpose described.

GEO. SCOTT.

Witnesses:
E. JAEGER,
W. W. RICHARDS.